(No Model.) 7 Sheets—Sheet 4.

W. H. CLARK.
CASH REGISTER, INDICATOR, AND RECORDER.

No. 556,045. Patented Mar. 10, 1896.

WITNESSES:
W. M. Wood
Wm Marker, Jr.

INVENTOR
William H. Clark
BY
Hallock & Lord
ATTORNEYS

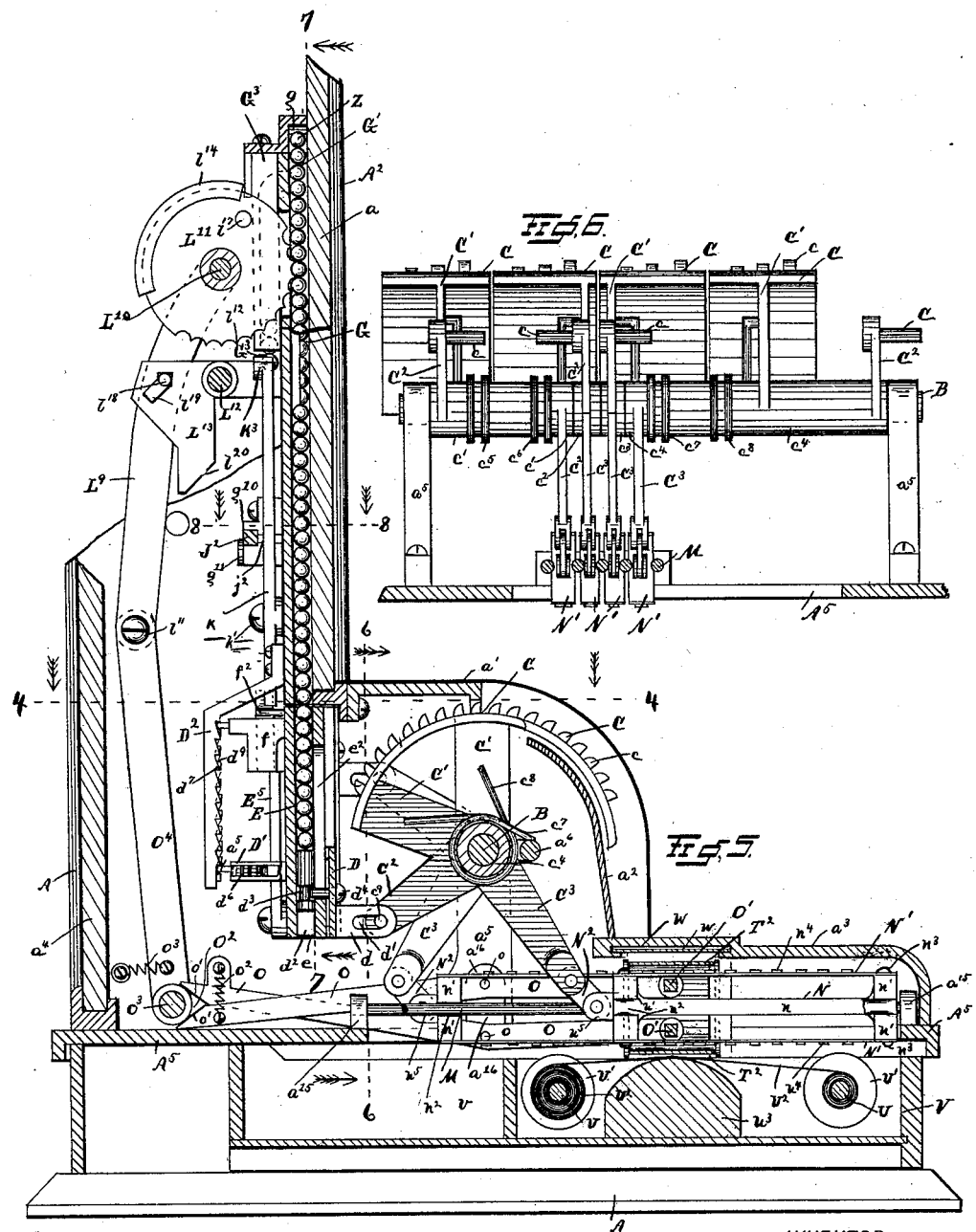

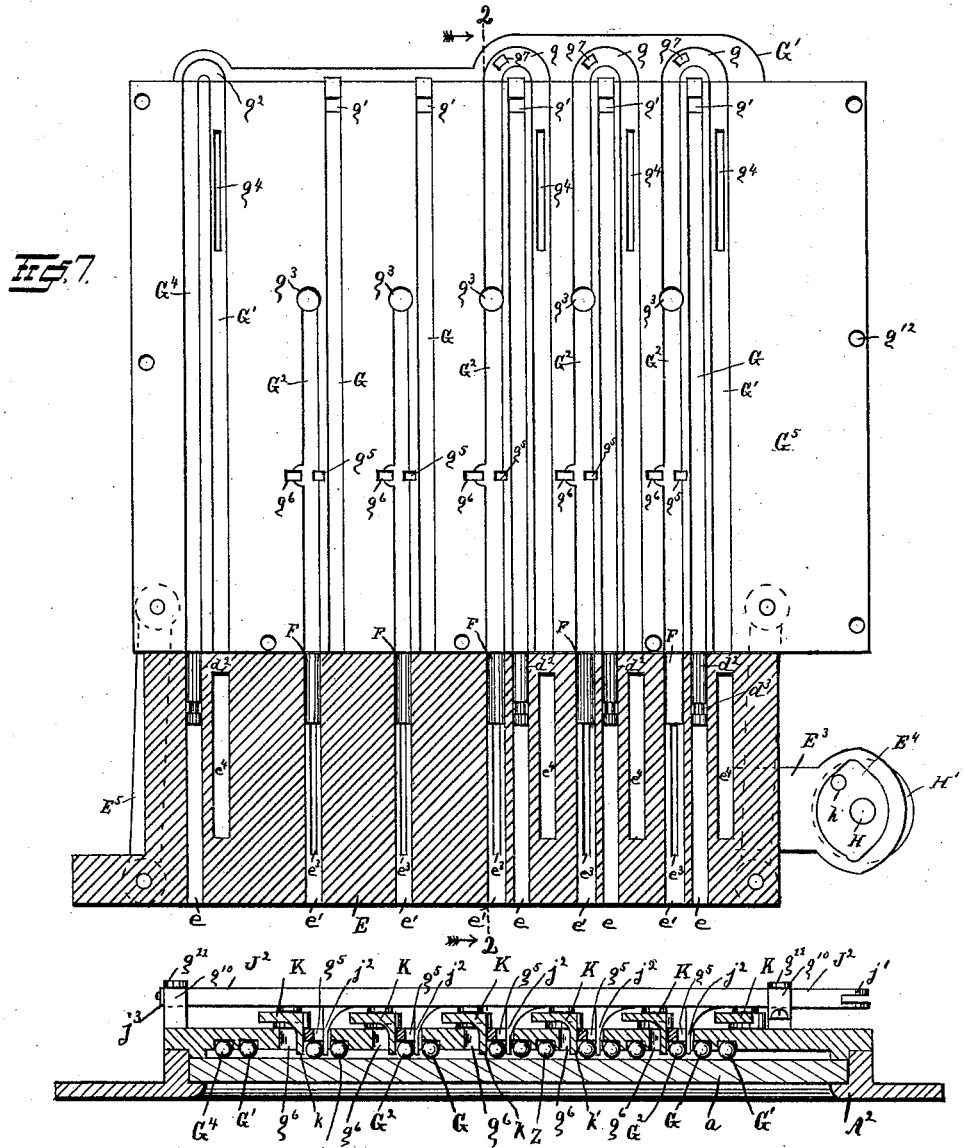

(No Model.)  7 Sheets—Sheet 7.
W. H. CLARK.
CASH REGISTER, INDICATOR, AND RECORDER.
No. 556,045.  Patented Mar. 10, 1896.
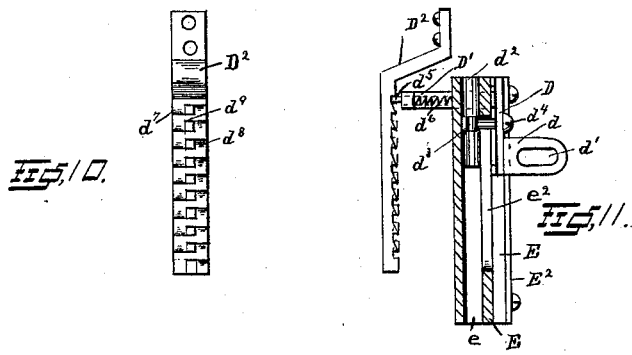
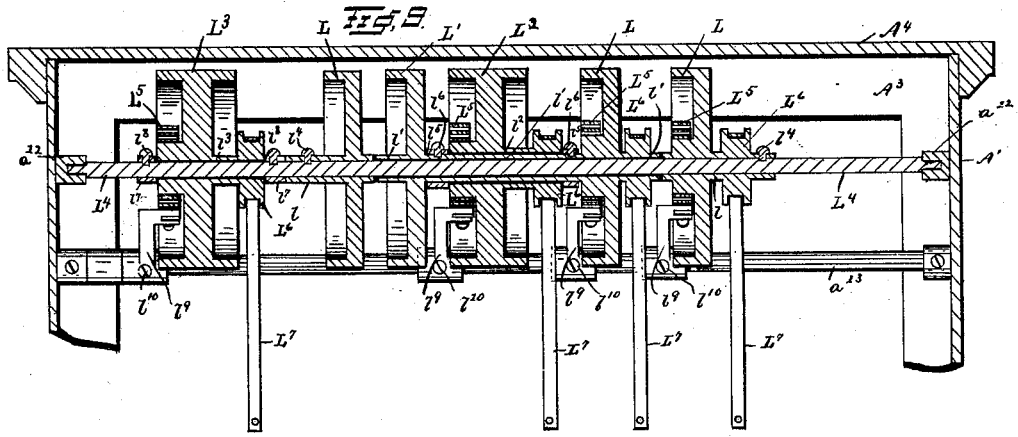
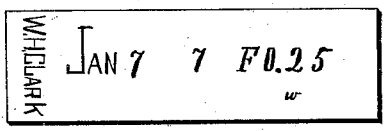
WITNESSES:
INVENTOR
William H. Clark
BY Hallock & Lord
ATTORNEYS

UNITED STATES PATENT OFFICE.

WILLIAM H. CLARK, OF ERIE, PENNSYLVANIA, ASSIGNOR TO THE ROCHESTER CASH REGISTER COMPANY, OF NEW YORK.

CASH REGISTER, INDICATOR, AND RECORDER.

SPECIFICATION forming part of Letters Patent No. 556,045, dated March 10, 1896.

Application filed March 16, 1895. Serial No. 542,018. (No model.)

*To all whom it may concern:*

Be it known that I, WILLIAM H. CLARK, a citizen of the United States, residing at Erie, in the county of Erie and State of Pennsylvania, have invented certain new and useful Improvements in Cash Registers and Indicators; and I do hereby declare the following to be a full, clear, and exact description of the invention, such as will enable others skilled in the art to which it appertains to make and use the same.

This invention relates to cash registers and indicators; and it consists in certain improvements in the construction thereof, as will be hereinafter fully described, and pointed out in the claims.

The improvements forming the subject-matter of this application are designed to accomplish in their general scope the following results: to display and indicate the amount of each registration as made, to print a detail record indicating the amount of each registration with its successive number and identifying characters, and to print a ticket for each registration tallying with the amount registered and displayed in the display-indicator and having thereon characters identifying it with its companion detail registration, together with any other printed matter desired.

Figure 1:
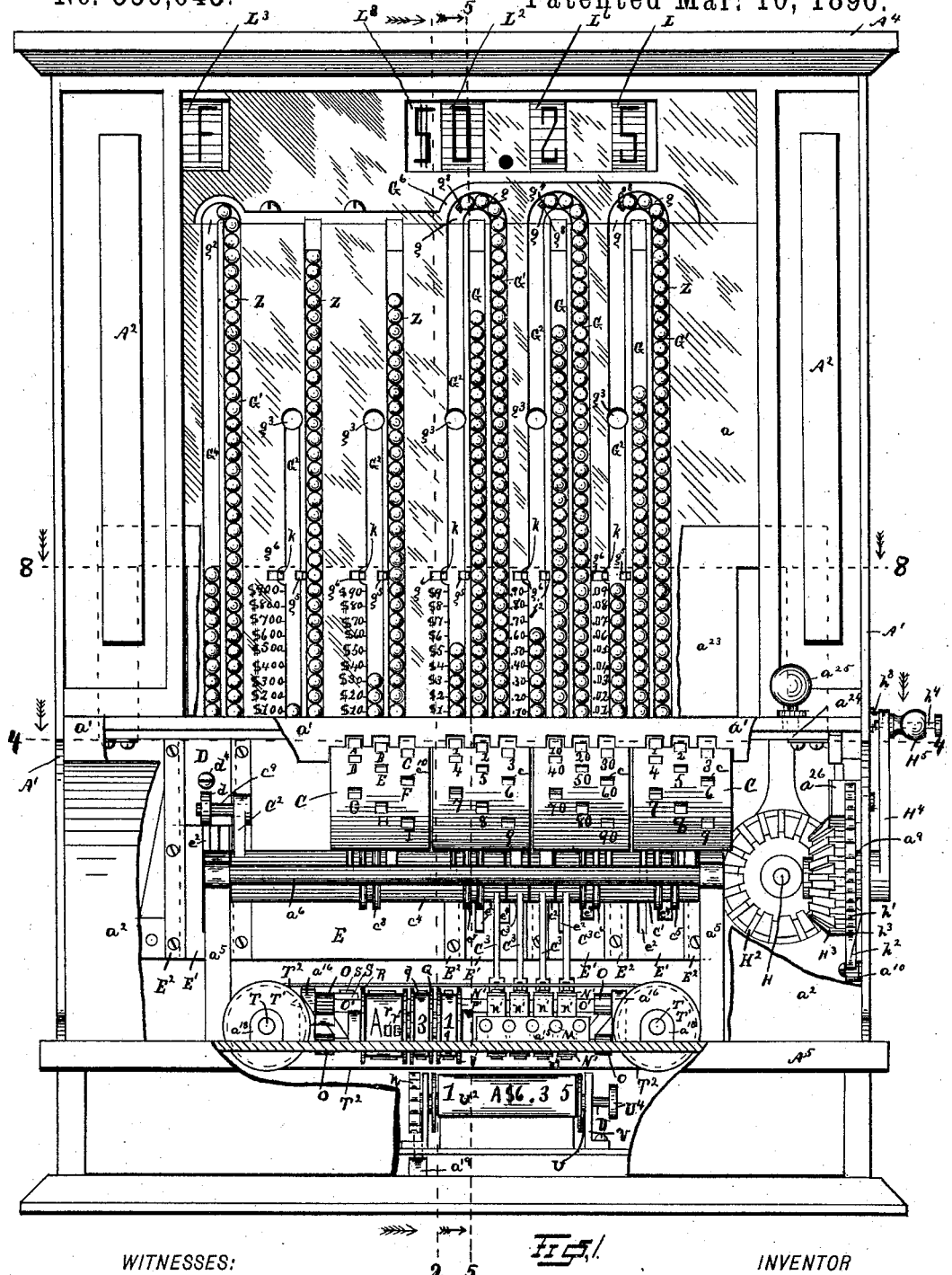
Figure 2:
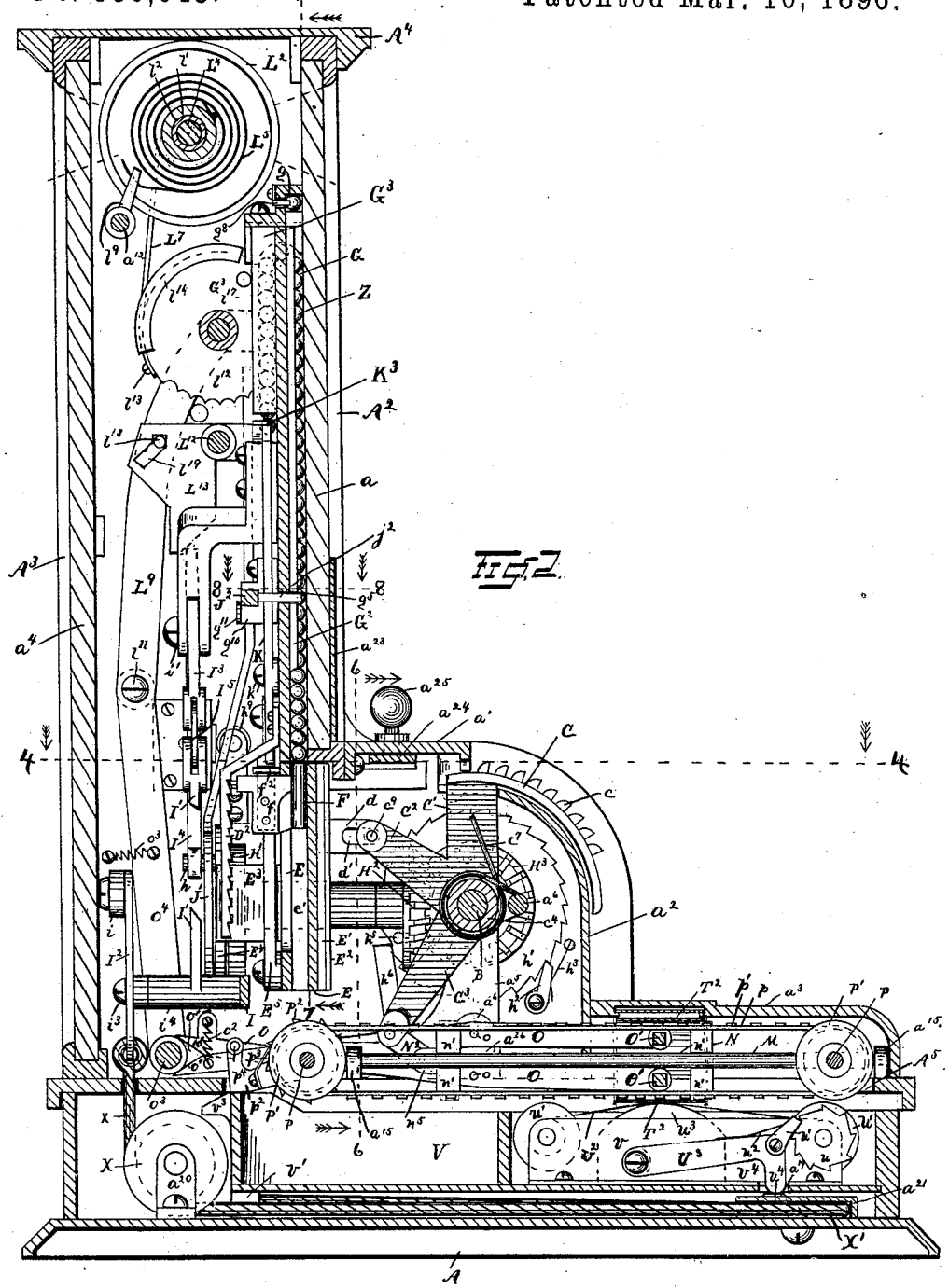
Figure 3:
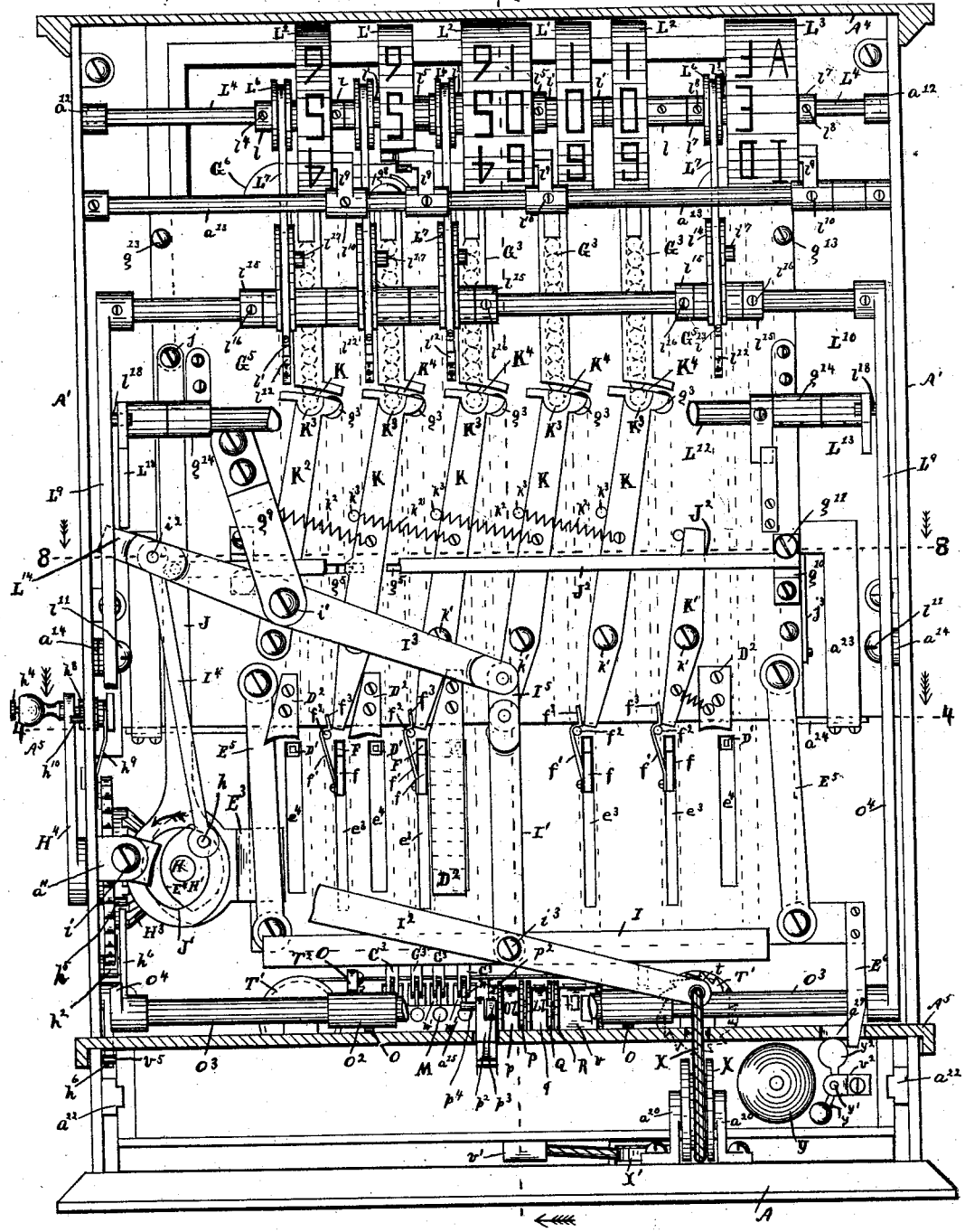
Figure 4:
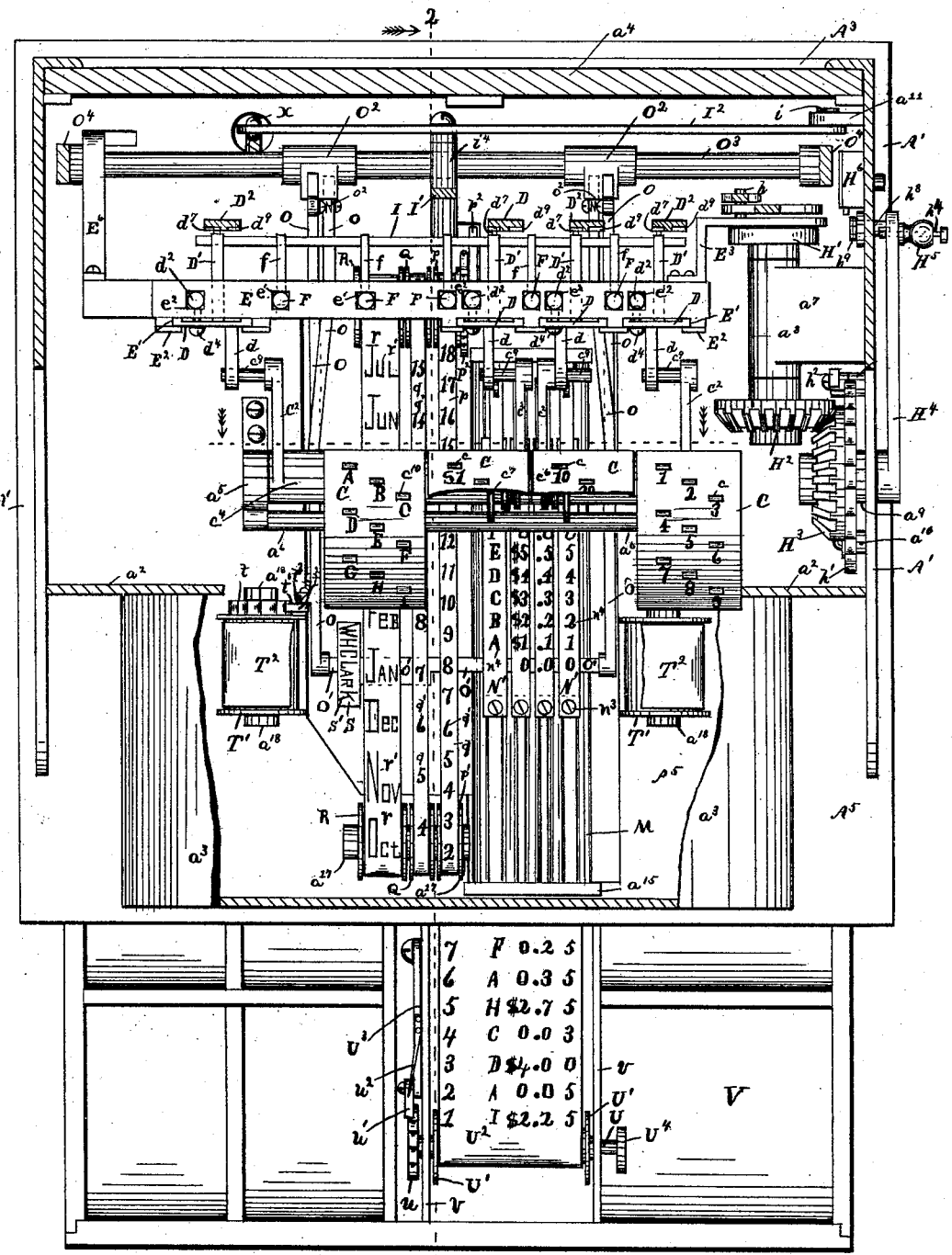

The invention is illustrated in the accompanying drawings, as follows:

Figure 1 is a front elevation of the machine, a part of the case being removed and part broken away to better show the construction. Fig. 2 is a sectional view, the general line of section being on the line 2 2 in Figs. 1, 3, and 4, the section of the grooved plate and transfer-bar, however, being on the line 2 2 in Fig. 7, the line of vision being indicated in each figure by the arrow. Fig. 3 is a rear elevation, the back plate being removed to better show construction. Fig. 4 is a sectional view looking from the top on the lines 4 4 in Figs. 1, 2, 3, and 5. Fig. 5 is a detail sectional view on the line 5 5 in Fig. 1, looking in the direction of the arrow. Fig. 6 is a detail view of the rear of the finger and the operating-lever directly connected therewith. Fig. 7 is a detail view showing the way-plate and transfer-bar in front elevation. Fig. 8 is a sectional view of said way-plate and the carrying mechanism on the line 8 8 in Figs. 1, 2, 3, and 5, looking in the direction of the arrows. Fig. 9 is a detail view in section of the display-indicator and mechanism looking from the front. Fig. 10 is a detail front view of the setting-rack. Fig. 11 is a detail side view of said rack and transfer-bar in section, showing the setting mechanism in engagement with said rack. Fig. 12 is a plan view of a ticket as printed by the printing mechanism.

The register is inclosed in a case composed of a base A, side piece, A', front piece, A², rear piece, A³, and top piece, A⁴, a drawer-plate A⁵ extending horizontally across the machine just over the drawer.

In the register here shown the computation is accomplished by the movement of series of tally-pieces, each series representing a different denomination, and these movements are effected by first setting the mechanism and then forcing the movement by means of a crank.

The setting means consists of the following mechanisms: A shaft B is mounted on the projections $a^5$, which extend upwardly from the drawer-plate $A^5$, and said shaft extends horizontally across the machine a little forward of the upper case. The finger-plates C are carried by the arms C' and journaled on this shaft B. The finger-plates have preferably all the numerals of one denomination (nine numerals) in succession displayed upon their faces, so that but one finger-plate is necessary for each denomination. They may, however, only display multiples or any amounts as is best suited to the business for which the register is intended. Just above or in the direction of the setting movement of said plate from each numeral is a finger-stop $c$ with which the finger contacts when placed on the plate over a numeral to set the mechanism to the amount of the numeral. This stop prevents the finger from slipping on the plates and positions the finger with reference to the plate. As the plate is pushed back the finger contacts a stop-bar $a'$. The numerals are arranged on the plate so that when the stop for any numeral is at the stop-bar the movement of the plate has been just sufficient to set the mechanism to register the amount of said numeral. In the register shown the movement of the plate is so small that if the finger-stops were arranged in line the space for the finger would be so small as to be inconvenient. They are therefore graduated across the plate successively in successive rows. The number of rows is regulated by the amount of space desired for each finger-stop. In the construction shown there are three, this making a convenient arrangement for the nine numerals of each denomination, as provided in the the machine shown. The plate to the right actuates the units or cents register, the next plate the tens or dimes register, the next plate to the left the hundreds or dollar register, and the last plate to the left is provided with a series of letters, this plate being designed to actuate the indicating and printing mechanism, to indicate and print a letter, to identify the class of goods sold, or the salesman, or department making the sale, or any other use that may suggest itself.

The arm C' of the dollar-plate extends from a hub on the shaft B, and extending from a hub is another arm, $C^2$, which is rocked by the movement of the finger-plate, so that the inner end of this arm has substantially vertical movement in proportion to the movement of the finger-plate.

A bar E, in which the separation of the tally-pieces for computation is accomplished, I term the "transfer-slide." This slide is suspended by links $E^5$, so as to have free lateral movement, and is located immediately under the way-plate $G^5$. (See Fig. 7.) It is provided with separating-ways $e$ and transfer-ways $e'$, which extend vertically through the slide.

The way-plate $G^5$ is provided with ways G G' $G^2$, which I term respectively the "storage," (G,) "elevating," (G',) and "register" way, ($G^2$.) They are constructed by grooving the plate $G^5$ and placing it against the front plate $a$, which is preferably of glass. The elevating-way is always filled with tally-pieces Z, which are preferably steel balls. The storage-way in the operation of the machine is so replenished that it always has in it a number of tally-pieces. The registering-way contains the tally-pieces indicating the amount of registration, and the tally-pieces are received and discharged therefrom as the operation proceeds.

The separating-ways $e$ are at normal directly under and in line with the storage-way G, and the transfer-way $e'$ is directly under the registering-way $G^2$. As the transfer-slide is reciprocated in the operation of the machine the separating-way is moved under the elevating-way, is there held stationary a short time, and returned to normal, and the same movement carries the transfer-way $e'$ under the storage-way, where the pause in the movement takes place, and is then returned to place.

A slot $e^2$ is cut through the front wall of the ways $e$, and just outside of these slots on the transfer-slide are guides formed parallel with said slots by means of the ribs E' and guide-plates $E^2$. (See Fig. 11.) Sliding in these guides are the slides D, from which extend the ears $d$, in which are the elongated slots $d'$, in which play the pins $c^9$. These pins $c^9$ are long enough to maintain their extension through the slots $d'$ during the lateral movement of the ears $d$ incident to the movement of the transfer-slide. The slots allow the movement of the pins incident to the pivotal movement of the arms $C^2$. Within the separating-ways $e$ are the plug-slides $d^2$. These slides are provided with circumferential grooves $d^3$, and pins $d^4$ extend from the slides D through the slots $e^2$ into these circumferential grooves $d^3$, so that the plug-slides $d^2$ are carried with the slides D.

It will be noted that at normal the separating-way $e$ is under the storage-way G, and as the plug-slide $d^2$ is lowered the tally-pieces will pass down into the separating-way, and that the number will be proportional to the downward movement. The stops $c$ on the finger-plate C are so graduated from the bar $a'$ that a movement of the plate so as to bring any stop to the bar will through the connected mechanisms lower the plug $d^2$ sufficiently to allow a number of tally-pieces to enter the separating-way equal to the number represented by the stop brought to the bar, so that if the first or "1" stop is brought to the stop-bar one tally-piece is lowered into the separating-way, &c.

In order that the plug-slide $d^2$ may be more accurately stopped at an exact diameter of a tally-piece or a multiple thereof so as to bring the upper tally-piece always just flush with the top of the transfer-slide I provide the following additional mechanism: Passing entirely through the transfer-slide and in the path of the slides D are the slots $e^4$. (See Figs. 3 and 7.) Immediately to the rear of these slots is a stop-rack $D^2$, which is rigidly attached to the way-plate $G^5$. Small tubes D', rigidly attached to the slides D, pass through the slots $e^4$ back nearly to the stop-racks $D^2$. Small pin-dogs $d^5$ are placed in the ends of the tubes and are pressed into engagement with the stop-racks $D^2$ by springs $d^6$ placed in the tubes. At the left side of the stop-rack $D^2$ the rack-teeth $d^7$ are inclined on their upper surfaces, ending in an abrupt under surface, so that the pin-dog $d^5$ can be moved downward over this side of the rack, but not upward. Coiled around the hubs carrying the finger-plates are the springs $c^5$, $c^6$, $c^7$ and $c^8$. These springs are attached at one end to the arms $C^2$ carrying the finger-plates and at the other to a rod $a^6$, which is carried by the projections $a^5$ before alluded to. These springs are so tensioned as to act against inward sitting movement of the finger-pieces and is strong enough to raise the slide $d^2$ with the tally-pieces and the other connecting mechanism, so that if a finger-stop $c$ is pushed a little by the stop-bar $a'$ the springs $c^5$, $c^6$, $c^7$ or $c^8$, as the case may be, will effect a return movement of the parts, so as to bring the pin-dog $d^5$ against the under side of the rack-tooth above it, and as the rack-teeth are each the diameter of a tally-piece in length and so positioned that each tooth will bring the uppermost tally-piece flush with the top of the transfer-slide this position of the tally-pieces brings the line of separation so as to allow the transfer-slide to be moved laterally without pinching a tally-piece as the ways $e$ are moved out of coincidence with the storage-ways G, as would be the case if a tally-piece were extended into both ways.

Grooves $d^9$ pass across the center of the rack $D^2$. These grooves are just wide enough to allow the free passage of the dog-pins as the transfer-slide is moved toward the right. These grooves have abrupt sides, so as to prevent the movement of the pin vertically. This arrangement locks the machine against movement as soon as the transfer-slide is started. At the right side of the rack is a series of teeth $d^8$, which are arranged oppositely to the teeth $d^7$, so as to allow only an upward or elevating movement of the parts to complete the registering movement.

The elevating-way G' is connected with the registering-way $G^2$ by a connecting-way $g$, which is preferably in a small top plate $G^6$. Extending through a slot $g^7$ in the back of the top plate into the connecting-way $g$ is a spring friction-plate $g^8$. This friction retains the last tally-piece at the top of the elevating-way in position, so that when ejected from under it it will fall into the registering-way. It also prevents any than those tally-pieces forced out from being carried over by momentum.

The movement of the tally-pieces in effecting a registration may be briefly described as follows: The number of tally-pieces corresponding to the number of the stop on the finger-plate brought to the stop-bar are lowered into the separating-way $e$. The transfer-slide is then moved to bring the separating-way under the elevating-way G'. The plug-slide $d^2$ is then raised, forcing tally-pieces from the separating-way into the elevating-way and at the same time forcing an equal number of tally-pieces over into the registering-way $G^2$, where the tally-pieces accumulate and indicate the registration by said accumulation. The mechanism for effecting these movements is as follows: At the right of the transfer-slide is a cam-bar $E^3$, which has formed in its end a cam-slot $E^4$. A lug $a^7$ (see Fig. 4) on the side plate, A', has a journal-box $a^8$ on its inner end in which is journaled a shaft H. This shaft carries at its rear end a disk H', on which is a pin $h$ which extends through the cam-slot $E^4$. The cam-slot is so shaped that when the disk is revolved the pin $h$ so contacts it as to give to the transfer-slide the reciprocating movement with the pauses at the extremes heretofore referred to. On the front end of the shaft H is a beveled gear $H^2$, with which meshes a beveled gear $H^3$. The gear $H^3$ is carried by a shaft (not shown) journaled in a journal-boss $a^9$ on the side of the frame, and to the outer end of this shaft is the crank $H^4$, having its handle $H^5$ conveniently shaped for operating. A press-plug $h^8$ extends through the side A' and is so positioned as to be immediately under the handle $H^5$. At the back side of this plug is a stop-pin $h^{10}$, which contacts the crank-arm and arrests its movement just as the handle is over the plug $h^8$. The plug $h^8$ is pressed outwardly by a spring $h^9$ on the inside of the side piece A'. Extending through the handle is a small press-pin $h^4$, which is held normally in its outward position by a spring (not shown) within the crank-handle. When it is desired to start the crank to operate the register the press-pin $h^4$ is pressed inwardly. This pushes in the plug $h^8$, which carries the pin $h^{10}$ out of the line of travel of the crank-arm, which permits of the forward movement of the crank. As soon as the handle is by the stop $h^{10}$ the press-pin $h^4$ is released, and, as the plug $h^8$ returns to position as soon as the press-pin passes over it, the pin $h^{10}$ will then be in position to arrest the crank at the completion of the revolution. A lock $H^6$ (see Fig. 4) is so placed that when locked its bolt passes over the press-plug $h^8$ and prevents said plug and pin $h^{10}$ from being pressed in out of the path of the crank-arm. When the bolt is thrown back, it allows a free movement of the plug. By this arrangement the register can be locked against forward movement when desired. Just back of the gear $H^3$ is a ratchet-wheel $h'$. A pawl $h^2$ is pivoted on the side plate and is actuated by a spring $h^3$, so as to engage the teeth of the ratchet-wheel, the teeth of which are so shaped that the pawl prevents a backward movement of the crank and operated parts when an operation is once commenced.

Just back of the transfer-slide and below the tubes D' is a bail I. An upright portion I' is rigidly attached to the bail and is suspended by a link $I^5$ from a lever $I^3$ intermediately pivoted at $i'$ on the way-plate $G^5$. A link $I^4$ is connected at one end to the link $I^3$ at $i^2$ and is journaled at the other end on the pin $h$. It will readily be seen by following the movement of the links that the revolution of the disk H' will give to the bail a vertically-reciprocating movement. This movement is so timed relatively to the movement of the transfer-slide that the bail reaches in its upward movement a position just opposite the bottom of the slots $e^4$ just as the transfer-slide reaches a position to bring the separating-way under the elevating-way, and during the pause in the movement of the transfer-slide at this point the bail is elevated, carrying with it any of the tubes D' which have been depressed and the plug-slides $d^2$ and tally-pieces lowered with said tubes. This upward movement is sufficient to force all the tally-pieces that have been lowered into the ways $e$, and in consequence an equal number of tally-pieces are ejected into the registering-ways of their respective denomination. Just as the bail reaches its extreme elevation the return movement of the transfer-slide begins, and this and the action of the dog-pin $d^5$ upon the rack $D^2$, together with the springs $c^6$, &c., prevents a return movement of the tally-pieces to the separating-way $e$. A lever $I^2$ pivoted to a lug $a^{11}$ on the side piece, $A'$, and pivoted at $i^3$ on a projection $i^4$ on the bail serves to steady the bail in its movements, the levers $I^2$ and $I^3$ acting to some extent as parallel bars.

It is obvious that to give the register any considerable capacity it is necessary, when the accumulation of tally-pieces in a lower denomination equals the amount represented by a tally-piece of the next higher denomination, to provide means of transferring the register indication from the register of said lower denominations to a register of the higher denomination, and this is accomplished by bringing a tally-piece into the register of the higher denomination and discharging the equivalent number of tally-pieces from the register of the lower denomination. The capacity is also increased by carrying the tally-pieces discharged to position in the storage-way for reuse. It will readily be seen that such a construction gives to the register great capacity. The general scheme of carrying and returning tally-pieces for reuse is not, however, herein claimed, and a detail description of these movements is simply given, that the novel means of accomplishing them may be better understood.

The mechanisms for accomplishing the carrying and the discharging and transferring of tally-pieces to the storage-way are as follows: Just back of the storage-way is what I term the "carrying-way" $G^3$, which is connected with the storage-way by a connecting-way $g'$. This carrying-way should at the commencement of operations contain at least twelve pieces, so that if all the tally-pieces carried into the registering-way are put into said registering-way to indicate discharged accumulation in the next lower way the supply in the carrying-way will not be exhausted before the carrying-way is replenished as a result of the discharge and transfer of the tally-pieces from the registering-way into which they have been carried into the storage-way, which operation forces the number of tally-pieces taken from the carrying-way over from the storage-way back into the carrying-way. Immediately under each of the carrying-ways is a rock-lever K pivoted to the way-plate $G^5$ at $k'$. At the upper end of these rock-levers are pockets $K^3$ of such depth as to contain one tally-piece, and so positioned as to be normally under and in continuation of the carrying-ways $G^2$. Extending each side of the pocket is a gate-bar $K^4$, which at normal covers the opening $g^3$ through the way-plate $G^5$ into the registering-way, and when the rock-lever is rocked covers the bottom of the carrying-way and prevents the escape of the tally-pieces therefrom. It will be seen that the registering-way to which a tally-piece is carried belongs to the same system or denomination as does the storage-way connected with the carrying-way from which said tally-piece is carried, so that the tally-pieces are kept in the same system.

Extending through the way-plate $G^5$ into the registering-ways are the slots $g^5$ and $g^6$. (See Fig. 7.) These slots are on a line with the position assumed by a tenth accumulated tally-piece in the registering-way. A sliding bar $J^2$ is carried by guides $g^{10}$ on the way-plate $G^5$ immediately back of the slots $g^5$. Screws $g^{11}$ screwed into the guides, with their heads extending over the bar $J^2$, hold it in place. Projecting from this bar through the slots $g^5$ are the projections $j^2$, which are normally positioned in the slot just at the right of the registering-ways. (See Fig. 8.) A cam-lever J pivoted to the way-plate at $j$ is attached to the sliding bar $J^2$ at $j'$, and is provided at its lower end with the cam-slot $J'$, which is acted upon by the pin $h$, so that the sliding bar $J^2$ is moved to the left just at the beginning of the last half of the revolution of the crank. By so timing the movement of the parts the tally-pieces actuated by the operation in progress have entered into the registering-way before the bar $J^2$ is moved, so that the total accumulation is in the register, so that the necessary carrying to complete the computation is done at each operation. The bar $J^2$ and cam-lever J are returned to place by a spring $j^3$ attached to the way-plate and pressing against the end of the bar $J^2$.

Extending from the rock-levers K through the slots $g^6$ are projecting pins $k$. When the rock-levers are at normal position these pins occupy a position just at the left of the registering-ways. The register-way at each side of the slot $g^6$ is cut away slightly, so as to allow a deviating movement of a tally-piece at this point. It will readily be seen that when there is accumulated in the registering-way a sufficient number of tally-pieces to bring one of the tally-pieces in the line of the movement of the projection $j^2$, said tally-piece is pinched between the projection $j^2$ and the pin $k$ and effects a movement of the pin $k$ and the rock-lever K, which carries a tally-piece from the carrying-way of the next higher denomination into the registering-way of that denomination. The slots $g^5$ and $g^6$ are so positioned as to pinch the eleventh actual tally-piece in the registering-way, which tally-piece is the tenth accumulated tally-piece in said way. Each rock-lever is provided with a small spring $k^2$ which returns the lever to place against a stop $k^3$.

In the transfer-ways $e'$ in the transfer-slide are plug-slides F. Slots $e^3$ pass through the rear wall of the ways $e'$, and plates $f$ on the plug-slides F pass out through this slot over the bail I. On the sides of each plate is a spring-catch $f'$ which engages a pin $f^2$ on the transfer-slide, and this holds the plug F at the top of the way $e'$. This spring-catch has an extension $f^3$, which is contacted by the end of the rock-lever K of the next higher denomination when it is rocked by the movement of the tenth accumulated tally-piece in the registering-way to which the plug-slide F, carrying the contacted spring-catch, belongs. This contact of the rock-lever releases the spring-catch and this allows the plug-slide to descend with the bail and when the transfer-way $e'$ comes under the registering-way the tally-pieces under the pinched tally-piece pass down into the transfer-way $e'$. The transfer-way is of such depth that it will allow only ten tally-pieces to enter it. The pinched tally-piece and the odd ones above it descend in the registering-way as soon as the pin $h$ moves sufficiently to allow the spring $j^3$ to move the bar back to place. The object in keeping the eleventh tally-piece in the registering-way is to raise the tally-pieces to be counted up into view. More than one tally-piece may be used for this purpose, if desired. The transfer-slide carries the discharged tally-pieces under the storage-way. The bail in its movement elevates them into the storage-way, and the catch $f'$ re-engages the pin $f^2$, which holds the plug up until there is again accumulated ten or more tally-pieces, when the operation is repeated.

The fourth and fifth systems of way from the left are not provided with an elevating-way G and separating-way $e$, as they are designed simply for registering the carried amounts. The operations of these systems are otherwise similar to the same operations in the systems described. The fifth system to the left being the last of the computing-ways the rock-lever K' connected with said system is simply rocked to discharge the ten accumulated tally-pieces when the register has reached its capacity.

To reset the machine the spring-catches $f'$ of each way are released to allow the register-ways to clear themselves of tally-pieces, and the crank is given a turn to carry these discharged tally-pieces into the storage-way. The rock-lever of each system is then rocked to carry a tally-piece into each of the registering-ways, as it is necessary in setting the machine to bring into each of the registering-ways the extra eleventh tally-piece before beginning operations. For convenience a rock-lever $K^2$ is provided for the unit system, which is rocked in a similar manner to bring a tally-piece into the units-registering way for this purpose.

On the face of the way-plate at the side of each registering-way are a scale of numerals, beginning at the bottom with a unit denomination to which the numeral belongs, and are extended upwardly, one for each tally-piece, so that the numeral representing the equivalent of a unit of the next higher denomination is pinched by the carrying mechanism. By reading the numeral opposite the highest tally-piece in each way we read the total amount of the register. For example, following this rule, the register as seen in Fig. 1 reads one hundred and thirty-five dollars and sixty-nine cents, ($135.69.) It is manifest that each tally-piece may represent a multiple of units of its denomination—as, for instance, in a register where it is desired to register only fives and multiples of fives. In this case there would be but two accumulated tally-pieces in the units-way before it carried, so it will be seen the multiples and amounts represented by each tally may be varied without varying the mechanisms accomplishing the necessary movements to make the registrations. In the machine shown the units and decimal multiples are used, as it is only in exceptional cases that a different arrangement is desired. It is also manifest that the number of denominations may be increased or diminished, as desired, by simply duplicating or taking away the mechanism shown.

A blind $a^{23}$ is attached to a slide $a^{24}$ and is operated by a handle $a^{25}$, so that it may cover the reading-face of the register and be moved from it when it is desired to read the register. It may be locked by a lock $a^{26}$.

The display indication is accomplished by a series of wheels having the indicating-figures on their peripheries. It will readily be seen that in order to give a proper arrangement of the wheels, so that the denominations will be in succession at both front and rear, (the largest at the left,) it is necessary to use two wheels for each denomination except one, on which may be two rows of figures, one of which is inverted, so that the one read on each side will appear right side up. The figures on one of the two wheels of each of the other denominations are also inverted for the same purpose. In the indicator shown the hundreds-indicator wheel $L^2$ is made the double wheel, and the tens-wheels $L'$ and the units-wheels L are some distance apart; but each pair is so connected as to rotate in unison. Each wheel is provided with characters representing the numerals of its denomination to correspond with the multiples used in the register. In the indicator shown there are ten characters, beginning with "0" and ending with "9," which characters are placed in successive order of equal graduations. The mechanism for accomplishing a movement of these wheels to make an indication corresponding to the registration in the register is as follows:

The wheels are all mounted on the shaft $L^4$, which is journaled in the bearings $a^{12}$ on the side plates, A'. The units-wheels are provided with hubs $l$ and are fixed with the shaft $L^4$ by means of set-screws $l^4$, so that they both turn together with the shaft $L^4$. The tens-wheels are both mounted on the same sleeve $l'$, which is adapted to rotate on the shaft $L^4$. The hundreds-wheel is provided with a hub $l^2$ and is journaled on the sleeve $l'$. At each side of the hundreds-wheel are collars $l^5$ provided with set-screws $l^6$, which hold the hundreds-wheel in place on the sleeve. One of each pair of wheels has on its hub a small band-wheel on which are wound and fastened flexible bands, preferably steel straps $L^7$. The lower ends of the straps are similarly attached to band-segments $l^{14}$ on toothed wheels $L^{11}$ by means of screws $l^{13}$. The toothed wheels $L^{11}$ are journaled on a shaft $L^{10}$ and are held in place thereon by collars $l^{15}$, which are secured by set-screws $l^{16}$, and are of such thickness as to move freely in slots $g^4$ through the way-plate to the rear of the elevating-ways. The teeth $l^{12}$ on the toothed wheel are of such shape as to readily engage the tally-pieces passing in the elevating-way, and the wheels are rotated thereby. The sizes of the band-segments $l^{14}$ and the band-wheels $L^6$ are such and the characters on the indicator-wheels are so graduated that the passage of a tally-piece in the elevating-way of any denomination actuates through the toothed wheel, band-wheels, and band the indicator-wheel one space or from "0" to the "1" indication, and the passage of another tally-piece will move the indicator-wheel to the "2" indication, and so on, the indicator-wheel indicating the number of tally-pieces forced through the elevating-way at each operation, and in consequence indicating the number of tally-pieces that enter the register, or, in other words, the amount of each registration.

It is desirable that the indication of each operation should remain displayed after the completion of the operation registering the amount displayed. It becomes necessary, therefore, to return the indicator to normal with the first movement of the operating mechanism in the succeeding operation, and to actuate the mechanism to produce an indication of the operation in progress at a later period of the operation. This is accomplished in the indicator shown by the following mechanisms: The shaft $L^{10}$ carrying the toothed wheels is mounted on the rock-levers $L^9$, which are pivoted at $l^{11}$ on a boss $a^{14}$ on the side pieces, A'. Cam-plates $L^{13}$ are mounted on a shaft $L^{12}$ and are provided with cam-slots $l^{19}$. The shaft $L^{12}$ is carried by bearing $g^{14}$ attached to the back of the way-plate $G^5$. Cam-pins $l^{18}$ pass through the cam-slots $l^{19}$, which are so acted upon by the cam-surfaces of the cam-slots that the rocking of the cam-plate $L^{13}$ rocks the levers $L^9$ and throws the toothed wheels out of engagement with the tally-pieces in the elevating-ways. The rocking of the cam-plate $L^{13}$ is accomplished by the action of a cam $L^{14}$ on the end of the lever $I^3$ upon the cam-surface $l^{20}$ on one of the cam-plates $L^{13}$.

Fig. 3 indicates the position of the parts at normal. By noting the position of the pin $h$ it will be seen that as it is turned forward (see arrow) it raises the link $I^4$ and the cam $L^{14}$ with its first movement, so that the toothed wheels are released with the first movement of the parts. When the pin $h$ has reached a position horizontally opposite the starting-point it brings the cam $L^{14}$ out of contact and allows the toothed wheels to be rocked back into engagement. A spring $o^3$ on the lever O, which is an extension of the lever $L^9$, moves the rock-levers $L^9$ and returns the toothed wheels to engagement with the tally-pieces in the elevating-ways, and this engagement takes place just before the tally-pieces effecting the registration are elevated. Each pair of wheels is provided with a spring $L^5$, which is coiled around the hub of one of them and secured at one end thereto. The free ends of the springs are attached to lugs $l^9$, which are secured by set-screws $l^{10}$ on a rod $a^{13}$ carried by the side piece, A'. The sesprings are tensioned to effect a movement of the indicator-wheels toward the normal, so that as soon as the toothed wheels are moved out of engagement with the tally-pieces the indicator-wheels are snapped back to zero and carry with them the band-wheels $L^6$, which effects a return movement of the toothed wheels to the normal position. Stop-pins $l^{17}$ on the toothed wheels contact the rear of the way-plate and limit the return movement at the zero or normal position. Just as the toothed wheels reach the normal position the elevation of the tally-pieces begins, and this actuates the toothed wheel corresponding to the number of tally-pieces elevated and so effects the display indication of the operation in progress.

The blinds and places of exposure are so arranged through both the front and rear of the case that only one set of wheels are exposed at each place, and there is provided on the case such characters as the dollar-signs $L^8$, decimal-points, &c., to facilitate the reading of the indication.

It is desirable in some instances to not only indicate the amount registered, but also to indicate the salesman, department, or class of goods. These purposes are accomplished by the following mechanisms: The stops of the last finger-plate to the left are provided with designating characters $c^{10}$, which may be any letter, as "A" or "B," as shown, or with names or other identifying characters, as desired. The plug-slide $d^2$ in the separating-way $e$ at the left of the transfer-slide is actuated from this finger-plate. The method of operating the letter finger-plate and the mechanism connecting said finger-plate with the plug-slide $d^2$ is the same as with the numeral finger-plates, and like parts are designated by the same letters, as with the numeral finger-plate mechanism.

The ways in the way-plate carrying the tally-pieces operated in connection with the finger letter-plate consist of an elevating-way, which is connected by a connecting-way $g^3$ direct with depositing-way $G^4$, which corresponds to the storage-way G, and is in line with the way $e$ when the transfer-slide is at normal. The elevating-way has the slot $g^4$, and an indicating mechanism similar to those connected with the registering systems operates an indicating-wheel $L^3$ at the left of the case, which wheel is provided with characters corresponding with the characters on the letter-plate. These characters are so arranged that the indicator displays the same character as the one operated on the letter finger-plate. The indicating-wheel $L^3$ is journaled on the shaft $L^4$ and is held in place by collars $l^7$, secured by set-screws $l^8$. The only object of the movement of the tally-pieces in this system being to operate the indicator, the tally-pieces ejected from the elevating-way are deposited in the depositing-way ready for reuse.

It will readily be seen that the register and indicator already described is complete for the purposes of indicating the amount of the total registration, and displaying and indicating the amount of each registration as made. If desired, the following mechanisms may be added to those described for printing a detail record indicating the amount of each registration with its successive number and identifying characters, and also, if desired, for printing a ticket in the likeness of the detail record with any additional matter that the use of the ticket may require.

A series of parallel guide-rods M are mounted on lugs $a^{15}$ on the drawer-plate $A^5$. A series of type-frames N are composed of the connecting-bar $n$, on which are end pieces $n'$. Guide-grooves $n^2$ are cut through the end pieces. The frames are placed between the guide-rods M, the guide-grooves receiving the guide-rods for holding the frames securely against movement in line with the guide-rods, between which the frames slide freely. The end pieces $n'$ extend somewhat above and below the connecting-bar $n$, and on the upper and lower sides thereof type-plates $N'$ are attached. These plates are preferably of very thin spring-steel and are secured at the ends by screws $n^3$, the holes through which the screws pass at one end being slightly elongated to allow the plates to be flexed. On each type-plate are a series of type $n^4$ for printing characters corresponding to the numerals, letters, &c., of the system to which the series of type belongs. Each frame is connected by means of a link $N^2$ with an arm $C^3$ which extends from the hub carrying the finger-plate belonging to the system corresponding with type on its type-plate, and each frame is reciprocated by the rocking of the arms $C^3$ incident to the movement of the finger-plate to which it belongs. The type are spaced on the type-plates to correspond with the spacing of the stops $c$ (or $c^{10}$) on the stop-plates, and are so positioned that the movement of the finger-plate necessary to bring any stop to the stop-bar $a'$ brings a type designed to print the character represented by the stop $c$ operated to a printing-line. When the finger-plates are at normal the naught type is at the printing-line, so that naught is printed in all those denominations in which the finger-plates have not been operated.

The letter type-plate is connected to the letter finger-plate in the same manner as the type-plates designed to print the numerals, the only difference being that there is no type designed to print at the normal position, so that unless the letter finger-plate is operated no impression is made.

It is desirable to have the type-plates close together, so that the characters when printed will be close together and may be read conjointly. In order that the arms $C^3$ may be in direct line with the frames with which they are connected it is necessary to vary the length of the hubs, the outside hubs extending under the finger-plates arranged at the center. For this reason the hubs $c^2$ and $c^3$ of the tens and hundreds finger-plates are very short. The hub $c'$ of the units finger-plate extends under the tens finger-plate and abuts the hub $c^2$ of the tens finger-plate and the arm $C^3$ extends from the inner end of the hub $c'$ in close proximity to the arm $C^3$ extending from the hub $c^2$. In a like manner the hub $c^4$ is extended under the hundreds finger-plate and the arm $C^3$ extends from its inner end. This hub is also extended to the left to bring the arm $C^3$ of the letter-indicator system to the left of the register, so as to allow for the two accumulating register-ways at the left of the register systems.

Two sets of platen-levers O are pivoted at $o$ on lugs $a^{16}$, extending from the drawer-plate $A^5$. The platen-bars $O'$ $O'$ are mounted on the front ends of these levers and extend one above and one below the connecting-bars $n$ and under and over the upper and lower type-plates, respectively, at the printing-line. The rear ends of the platen-lever are crossed and terminate in cams $o'$ $o'$. Cams $O^2$ $O^2$ are carried by the cam-rod $O^3$ and the cam-rod $O^3$ is carried by and rocked with the lever ends of the rock-levers $O^4$. The cams $O^2 O^2$ act upon the cams $o'$ $o'$ when the lever $O^4$ is rocked and spread the levers O O and consequently force upwardly and downwardly the platen-bars $O'$. The flexibility of the type-plates is such as to allow the type at the printing-line to be moved with the platen-bars so as to effect the printing.

As the arms $C^3$ rock in unison with the arms $C^2$ it is evident the return movement of the type-frames will begin with the beginning of the elevation of the slides D, so that it is necessary that the printing should be completed and the platen brought back to normal before the elevating movement begins.

It will be remembered that the rock-lever $L^9$ is rocked and returned to normal before this elevating movement takes place. As the lever $O^4$ is simply an extension of the levers $L^9$, it is also rocked and returned to normal before the elevating movement begins, and consequently before the beginning of the return movement of the type-frame. This allows the cams $O^2$ $O^2$ to act and return and the springs $o^2$, which are tensioned to draw the levers together, to return the platen-bars to normal at the proper time.

Shafts P (see Fig. 2) are mounted on lugs $a^{17}$ extending upwardly from the deck immediately to the left (front and rear) of the guides M. The spools $p'$ are journaled on these shafts and are placed on that end of the shaft adjacent to the type-frames. A flexible type-band $p$ is carried by the spools P', so that the upper span of the band is over the upper platen-bar and the lower span below the lower platen. Type designed to print numerals in consecutive order beginning with one and running up fifty or a hundred, as the length of the band will permit in two series, are so placed that there will always be the same type-number at the printing-line above and below. On the rear spool there is secured a ratchet-wheel $P^2$. (See Fig. 2.) A pawl-plate is journaled on the rear shaft, P, and falls by gravity when the drawer is opened, so that the stop-pin $p^4$ contacts the deck $A^5$. A spring-pawl $p^3$ is carried by the pawl-plate $p^2$ and is adapted to engage the teeth of the ratchet-wheel $P^2$. The teeth of the ratchet-wheel are spaced to correspond with the spaces between the type on the band $p$, so that by the movement of the ratchet-wheel the space of a tooth will move a new type to the printing-line. The cam-plate $p^4$ is normally held in the position shown in Fig. 2 by the top of the drawer. When the drawer V is opened the cam-plate drops bringing the stop $p^4$ to the drawer-plate and the spring-pawl into engagement with the next tooth on the ratchet-wheel. When the drawer is closed a cam $v^3$ at its rear end contacts the cam-plate and raises it, and so effects the movement of the ratchet-wheel and the type-band one space, thus bringing the next consecutive number to the printing-line ready for the next operation.

On a spool R at the left of the shaft P is a band $r$, having placed thereon type $r'$ designed to print characters indicating the different months. The band has but one series and is designed to print only on top. It is moved by manipulating the spools R.

In the center of shaft P and just to the right of the spool R is a spool Q, carrying a band $q$, having one series of type $q'$ designed to print numerals up to thirty-one. This band is also moved by manipulating the spool Q and is designed to print characters indicating the day of the month.

At the left of the band $r$ and attached to the platen is a stamp S, having type $s'$, to print a name or device as desired.

In the drawings the type are shown as they read, while to any one familiar with printing it will be apparent that the type as actually used will have the somewhat different form necessary to make the impression to read as shown.

Two ribbon-spools T' are journaled on shafts T, which are mounted in lugs $a^{18}$ on the drawer-plate $A^5$. These spools are at each side of the printing apparatus and carry an ink-ribbon $T^2$, the upper span of which is just across the upper type plates and bands, and the lower span of which is across the lower type plates and bands. A ratchet-wheel $t$ (see Fig. 4) is secured at the side of the ribbon-spool at the left and is actuated at each operation of the register by a ratchet-pawl $t'$, pivoted at $t^2$ on the platen-lever O with which it reciprocates. A spring $t^3$ holds the pawl in engagement with the teeth of the ratchet-wheel. This movement of the spools changes the position of the ribbon with relation to the type at each operation, thus insuring a supply of ink to effect the printing.

As shown by Fig. 4, the drawer-plate $A^5$ is cut out, exposing the drawer for some space, so that the detail record-roll $U^2$ may be placed in the drawer and still be acted upon by the printing apparatus. The spools U' on which are wound the record-roll, are carried by shafts U, which are journaled in the partitions $v$ of the drawer. The shafts are provided with a hand-wheel $U^4$ with which to turn the spools to wind on the record-roll or to move it to ascertain the amount of a certain registration. The span of the record-roll is held in position for receiving the impression at the printing-line by a pack-plate $U^3$. On the front shaft U, at the side opposite the hand-wheel, is a ratchet-wheel $u$. A pawl $u'$ is pressed into engagement with the teeth of the ratchet-wheel by a spring $u^2$, and is carried by a pawl-plate $u^3$, which is pivoted on the partition $v$ of the drawer. The pawl-plate is provided with a cam $u^4$, which passes through an opening $v^4$ in the bottom of the drawer and rests normally on a cam-lug $a^{19}$ on the base of the case. When the drawer is opened, the pawl-plate $u^3$ falls by gravity, so that the pawl $u'$ engages the next tooth on the ratchet-wheel, and when the drawer is closed the cam $u^4$ contacts the cam-lug $a^{19}$ and raises the pawl-plate, and this movement carries the pawl forward and turns the ratchet-wheel and winds the record-roll on the spool, bringing a new surface under the printing-line ready for the next operation. The advantage of this arrangement of the record-roll is manifest. The operator upon opening the drawer has before him the record of the amount registered to assist him in making change and in discovering mistakes. The record is readily accessible for reference and at the same time normally kept in a position free from dust.

As it is not usually desired, the date is not printed on the record-roll, and the plates carrying the type for printing these characters are arranged to print only on top.

A ticket-receiving plate W (see Figs. 2 and 5) is formed in the cover of the case $a^3$, in which a ticket $w$ is placed to be printed. In the register shown each ticket is placed separately in the receiving-plate by the operator. The style of the ticket printed by the last operation of the register shown is seen in Fig. 12. By reference to Fig. 4 it will be seen that the record of the consecutive number, identifying-letter and amount of the last operation of the register corresponds in number, identifying-letter and amount with that printed on the ticket. The ticket may be used to give to a cashier when the register is not used as a cash-receptacle, or it may be given to a purchaser for memorandum or in any manner as the peculiarity of the business may suggest.

The drawer V is carried on slide $a^{22}$ and its bottom is raised slightly above the base. A pulley X is journaled in lugs $a^{20}$ at the rear, and a second pulley, X', is journaled sidewise under a lug $a^{21}$ at the front of the base. The lever $I^2$ is extended to a position over the pulley X, and a flexible cord $x$ is attached to the end of the lever $I^2$ and passed under the pulley X around the pulley X' and is attached to the rear of the drawer by means of a lug $v'$. (See Fig. 2.) The length of the cord is such that when the parts are at normal and the drawer closed the cord is just taut. When the lever $I^2$ is raised with the bail I, as heretofore explained, the cord drawing from the front pulley draws the drawer open. The flexibility of the cord allows the register to be brought to normal (the lever $I^2$ to place) before the drawer is closed.

On the ratchet-wheel $h'$ is a stop-pin $h^5$. A lever $h^6$ (see Fig. 3) is pivoted on the side plate. A pin $v^5$ on the drawer contacts, when the drawer is closed, this lever $h^6$ and holds it normally out of the path of the pin $h^5$. When the drawer is opened the lever is swung by the action of a spring (not shown) into position to contact the pin $h^5$, and thus retard the forward movement of the register mechanism. By following the movement of the pin $h$ and links and levers $I^4$, $I^3$, $I'$, and $I^2$ it will be seen that the pin $h$ proceeds some distance before the lever $I^2$ is raised so as to give the initial movement to the drawer. This slight forward movement carries the pin $h^5$ by the lever $h^6$, so that it does not arrest the movement of the part until the completion of the operation in progress. Before a second operation is begun, however, the drawer must be closed so as to swing the lever $h^6$ out of the path of the pin $h^5$.

The objects of the mechanism are well known, the principal one being to prevent forgetfully putting money into the drawer without registering. In the machine shown this precaution is also necessary to insure the actuation of the consecutive number type-band $p$ and the record-roll, both of which depend upon the movement of the drawer for their movement.

On the rear plate of the drawer is a gong Y. (See Fig. 3.) A clapper $y$ is pivoted at $y'$ to the rear plate of the drawer and held in place by the plate $v^2$. A lever $y^2$ extends upwardly from the clapper-lever, and a bar $E^6$ extends downwardly from the transfer-slide through a slot $a^{27}$ in the drawer-plate, so as to contact the lever $y^2$ when the transfer-slide is moved. The transfer-slide moves sufficiently before the drawer is drawn out for the bar $E^6$ to actuate the clapper and so sound the bell. Before the drawer is closed the bar $E^6$ has been brought back to normal at the completion of the register operation.

In order that the relative movements of the different parts may be better understood the movements of the parts may be consecutively described as follows: By way of premise it may be observed that the closing of the drawer at the next previous operation has actuated the consecutive number-band so that the proper consecutive number is at the printing-line. The closing of the drawer has also moved a new surface of the record-roll to the printing-line. The indicator displays the amount of the last registration. The stop C, designating the amount to be registered, is pushed forward to the stop-bar $a'$. This, through the rock-arm $C^2$, lowers the designated number of tally-pieces into the separating-way, where they are positioned and maintained by the co-operation of the springs $c^8$ and the rack-and-pawl mechanism $D^2$ and $D'$. The same movement of the finger-plate moves the type-plate $N'$ so as to bring the type designed to print the designated amount to the printing-line. The ticket is slipped into the receiving-plate W and the crank is turned. The first movement of the crank raises the link $I^4$, cam $L^{14}$ and rocks the cam-plate $L^{13}$. This actuates the rock-levers $L^9$ and $O^4$ and brings the cams $O^2$ into the operation with the platen-levers O and raises and lowers the platen-bars and prints the ticket and the record-roll. (Incidentally this movement actuates the ink-ribbon.) This same movement of the rock-lever $L^9$ brings the toothed wheel $L^{11}$ out of engagement with the tally-pieces and allows the indicator-wheels to snap back to place by the action of the springs $L^5$. A slight advance in the movement of the crank lowers the cam $L^{14}$ and allows the lever $L^9$ to be returned to position by the action of the spring $o^3$, and this also allows the platen-bars $O'$ to be brought to normal by the action of the springs $o^2$. As the crank is farther advanced, the transfer-slide is moved so as to bring the separating-way under the elevating-way, where there is a pause in its movement, owing to the peculiar shape of the cam-slot $E^4$. This movement rings the gong. As this movement is completed the bail begins to rise and carries with it the plugs $d^2$ and elevates the tally-pieces, forcing into the register the designated number of tally-pieces where they are read, computed, and discharged, as heretofore described. As the tally-pieces are passing up through the elevating-way they act upon the toothed wheel $L^{11}$ and turn it the number of teeth there are tally-pieces elevated. This turns the indicator-wheel so as to display the designated number. This elevating movement also brings the operated finger-plate to normal and of course the actuated type-frame to normal with said finger-plate. As the bail I is elevated the lever I² is also raised. This opens the drawer and exposes the detail record. A further movement of the crank brings the transfer-slide to normal and the lever I² to position. The change is made, the drawer closed and the ticket removed. This completes the operation.

What I claim as new is—

1. In a cash register and indicator the combination with a guideway and a series of tally-pieces carried by said guideway; of a separating mechanism that separates different numbers of tally-pieces in said series as actuated; and an operating finger-plate having a graduated movement for actuating said separating mechanism and having characters thereon indicating the number of tally-pieces separated by each movement.

2. In a cash register and indicator, the combination with a guideway and a series of tally-pieces carried by said guideway; of spring-actuated mechanism for sustaining said tally-pieces in position in said way; and means for actuating said sustaining mechanism for separating tally-pieces in said series.

3. In a cash register and indicator the combination with a guideway and a series of tally-pieces carried by said guideway; of a spring-actuated mechanism for sustaining said tally-pieces in position in said way; and an actuating means for separating in said series a number of tally-pieces that is operated against the resistance of said spring.

4. In a cash register and indicator, the combination with a guideway and a series of tally-pieces carried by said guideway; of mechanism for sustaining said tally-pieces in said way; a spring operatively connected with said sustaining mechanism and of sufficient strength to actuate said tally-pieces toward the normal; an actuating means for separating in said series a number of tally-pieces that is operated against the resistance of said spring; and a pawl-and-rack mechanism for accurately stopping the return movement effected by said spring at a line of separation in said series of tally-pieces.

5. In a cash register and indicator, the combination with a guideway and a series of tally-pieces carried by said guideway; of mechanism for sustaining said tally-pieces; a spring operatively connected with said sustaining mechanism and of sufficient strength to actuate said tally-pieces toward the normal; an operating finger-plate having a graduated movement against the resistance of said spring for actuating said sustaining mechanism to effect a separation in said series of tally-pieces; a stop-bar for stopping the movement of said plate at the graduation desired; and a pawl-and-rack mechanism that coacts with said spring to accurately position said sustaining mechanism for each movement of the operating finger-plate at a line of separation in said series of tally-pieces.

6. In a cash register and indicator with a guideway; a series of tally-pieces carried by said guideway; and the frame sustaining the operative parts; of slides for sustaining said tally-pieces in said way; an operating finger-plate having a graduated rock movement, and connected by a rock-arm with said sustaining-slide; a coiled spring as $c^8$ coiled about the axis about which the finger-plate rocks so attached and tensioned as to effect a movement toward the normal; a stop-bar for stopping the movement of said plate at the graduations desired; and a pawl-and-rack mechanism that coacts with said spring to accurately position said sustaining-slide for each movement of the operating finger-plate at a line of separation in said series of tally-pieces.

7. In a cash register and indicator, of the class named, having the means for actuating tally-pieces comprising the storage and elevating way, transfer-slide and separating-way therein; the combination of the sustaining-slide in the separating-way; a spring-pawl carried with said slide; the mechanism for actuating the sustaining-slide to separate the tally-pieces desired and for actuating the transfer-slide; of the rack $D^2$ having the oppositely-inverted teeth $d^7$ and $d^8$ and the grooves $d^9$ for the purposes set forth.

8. In a cash register and indicator of the class shown, the combination with tally-pieces that register by their accumulation and are discharged when the number of tally-pieces accumulated equals a unit of the next higher denomination; and a registering-way for containing said tally-pieces as accumulated; of a slide sustaining said tally-pieces in said way; a catch that holds said slide normally in position; a carrying mechanism that transfers a register indication from said way to a register indication of a higher denomination when there is accumulated in said way tally-pieces the equivalent of a unit of a higher denomination; and means that releases the catch and slide to allow the discharge of said tally-pieces when said carrying mechanism is operated.

9. In a cash register and indicator, the combination with a series of tally-pieces, a guideway for said tally-pieces comprising the registering-way and storage-way; and a transfer-slide having a transfer-way therein that is moved from the registering to the storage way; of a carrying mechanism for effecting transfer of a registration in said registering to a register of a higher denomination; a slide in said transfer-way; a catch for holding said slide normally in position to sustain the tally-pieces in the registering-way; and means of releasing said catch when said carrying mechanism is operated for the purposes set forth.

10. In a cash register and indicator, the combination with a series of tally-pieces, the guideway for said tally-pieces comprising the registering-way and storage-way; a transfer-slide having a transfer-way therein that is moved from the registering-way to the storage-way; of a carrying mechanism for effecting a transfer of a registration in said registering-way to a register of higher denomination; a slide in said transfer-way; a spring-catch $f'$ carried by said slide; having the extension $f^3$ that contacts a moving part of the carrying mechanism for the purposes set forth.

11. In a cash register and indicator, the combination with the operating-crank thereof; of the spring-actuated press-plug $h^8$ on the case and carrying a stop normally in the line of movement of said crank; and a press-pin carried by said crank and adapted to carry with its movement the press-plug $h^8$ and its stop out of the line of movement of said crank.

12. In a cash register and indicator, the combination with the operating-crank thereof; of the spring-actuated press-plug $h^8$ on the case and carrying a stop normally in the line of movement of said crank; and a spring-actuated press-pin $h^4$ carried by the handle of said crank and adapted to carry with its movement the press-plug $h^8$ and its stop of the line of movement of said crank.

13. In a cash register and indicator, the combination with the operating and guiding mechanism; of tally-pieces that register by their accumulation; mechanism for actuating said tally-pieces to register any of several amounts as desired; and a display-indicator in which is brought to view with each operation a character indicating the number of tally-pieces accumulated by the same operation.

14. In a cash register and indicator, the combination with the operating and guiding mechanism; of tally-pieces that register by their accumulation; mechanism for actuating said tally-pieces to register any of several amounts as desired; and a display-indicator wheel having arranged thereon characters to indicate the accumulation of tally-pieces; and means of rotating said wheel to bring to view at each operation the character indicating the accumulation of tally-pieces by the same operation.

15. In a cash register and indicator, the combination with the operating mechanism; of guideways; tally-pieces of different denominations that register by their accumulation therein; and a display-indicator that indicates at each operation in like denominative succession at both front and rear the number of tally-pieces accumulated in each way by the operation.

16. In a cash register and indicator, the combination with the operating mechanism; of guideways; tally-pieces of different denominations that register by their accumulation therein; mechanism for actuating the tally-pieces to register in each way any of several amounts as desired; and a display-indicator in which are brought to view with each operation characters indicating at both front and rear in like denominative succession the number of tally-pieces accumulated in each way by the operation.

17. In a cash register and indicator, the combination with the operating and guiding mechanism; of tally-pieces that are moved to effect a registration; mechanism that effects a movement of different numbers of tally-pieces to register any of several amounts; and a display-indicator that is actuated by the movement of said tally-pieces that indicates the amount registered at each operation.

18. In a cash register and indicator, the combination with the operating and guiding mechanism; of tally-pieces that are moved to effect a registration; mechanism that effects a movement of different numbers of tally-pieces to register any of several amounts; a display-indicator wheel having the indicating characters thereon; and means actuated by the movement of said tally-pieces that actuate said wheel to display the character indicating the registering for each operation.

19. In a cash register and indicator, the combination with the operating and guiding mechanism; of tally-pieces that are moved to effect a registration; mechanism that effects a movement of different numbers of tally-pieces to effect a registration of any of several amounts; a toothed wheel that engages said tally-pieces and is moved therewith; and a display-indicator that is actuated by said toothed wheel that indicates at each operation the registration effected by the tally-pieces.

20. In a cash register and indicator, the combination with the operating and guiding mechanism; of tally-pieces; mechanism for moving different numbers of tally-pieces to effect a registration of any of several amounts; a display-indicator that is actuated by the movement of said tally-pieces; and means of releasing said indicator from the control of said tally-pieces and returning it to normal at the beginning of an operation.

21. In a cash register and indicator, the combination with the operating mechanism; of a guideway for tally-pieces; mechanism for moving different numbers of tally-pieces to effect a registration of any of several amounts; a display-indicator that is actuated by said tally-pieces in their movement; means connected with said tally-pieces for retaining said indicator in place to indicate a registration until a succeeding operation is begun; and means of releasing said indicator from the control of said tally-pieces and returning said indicator to normal at the beginning of an operation.

22. In a cash register and indicator, the combination with the operating and guiding mechanism; of tally-pieces that are moved to effect a registration; a toothed wheel that is normally in engagement with said tally-pieces and is moved thereby; a display-indicator that is actuated by said toothed wheel; means for moving said toothed wheel out of engagement with said tally-pieces at the beginning of an operation; means of returning the indicator to normal while said wheel is out of engagement; and means of returning said toothed wheel to normal before the movement of the tally-pieces begins.

23. In a cash register and indicator, the combination with the operating and guiding mechanism; of tally-pieces that are moved to effect a registration; a toothed wheel as $L^{11}$; a shaft as $L^{10}$ on which said toothed wheel is journaled; rock-levers as $L^9$ carrying said shaft; means actuated by the operating mechanism for actuating said rock-lever to move said toothed wheels out of engagement at the beginning of an operation; an indicator-wheel as L; a band as $L^7$ for communicating movement from the toothed wheel to said indicator-wheel; a spring for returning the indicator-wheel to normal while said toothed wheel is out of engagement; and a spring that actuates the rock-levers to return the toothed wheel to engagement before the movement of the tally-pieces begins.

24. In a cash register and indicator, the combination with the operating and guiding mechanism; of tally-pieces that are moved to effect a registration; a setting mechanism for actuating the number of tally-pieces moved; a setting mechanism provided with an identifying character; a guideway for tally-pieces that are actuated by said setting mechanism; and an indicator actuated by said tally-pieces that indicates the number and character of the setting mechanism actuated.

25. In a cash register and indicator, the combination with a guideway; a series of tally-pieces carried by said guide; and mechanism for actuating different numbers of said tally-pieces to register any of several amounts; of a printing mechanism actuated with said registering mechanism that makes an impression indicating the registration effected by said tally-pieces.

26. In a cash register and indicator, the combination of a series of guideways; tally-pieces carried by said guides, the tally-pieces of each guideway representing a separate denomination; and mechanism for actuating said tally-pieces to effect a registration of any of several amounts in any of said ways; of a printing mechanism actuated with said registering mechanism that makes an impression indicating in each denomination the registration effected by the tally-pieces.

27. In a cash register and indicator, the combination with a guideway; tally-pieces carried by said guideway; and mechanism for separating different numbers of tally-pieces as desired in said way, said separating mechanism having a movement corresponding to the number of tally-pieces separated; of a guide; and a sliding frame mounted on said guide that is actuated by said separating mechanism to move correspondingly therewith and having mounted thereon a type for each movement to print a character indicating the registration effected by said movement so positioned with reference to a printing-line as to be brought to said line with the corresponding movement of the separating mechanism.

28. In a cash register and indicator, the combination with a guideway; tally-pieces carried by said guideway; a rotatively-rocked setting mechanism; and a separating mechanism actuated by said setting mechanism to separate different numbers of tally-pieces in said way as desired; of an arm as $C^3$ carried by and rocked with said setting mechanism; a guide; and a sliding frame mounted on said guide that is reciprocated by said arm as $C^3$, and having type mounted thereon and arranged as described designed to print a character for each registration indicating said registration.

29. In a cash register and indicator, the combination with a guideway; tally-pieces carried by said guideway; and mechanism for separating different numbers of tally-pieces, as desired, in said way, said mechanism having a setting movement and a return movement at a later stage of the operation; of a printing mechanism set by the setting movement and returned with the return movement of said mechanism; and mechanism actuating the printing mechanism to make an impression between the setting and return movements of said separating mechanism.

30. In a cash register and indicator, the combination with a guideway; tally-pieces carried by said guideway; and mechanism for separating different numbers of tally-pieces, as desired, in said way, said mechanism having a setting movement corresponding to the number of tally-pieces separated, and a return movement at a later stage of the operation; of a guide; a sliding frame mounted on said guide, and carried with said separating mechanism in its setting and return movement and having type mounted thereon in the described order; and means of effecting the impression for printing between the setting and return movement.

31. In a cash register and indicator, the combination with the registering mechanism having a moving part therein graduated to move in ratio to the registration effected with each movement; of a guide; a sliding frame mounted on said guide and carried with said moving part of the registering mechanism and having mounted thereon two series of type containing the same characters arranged in the same order and to correspond to the graduation of the registering mechanism; and mechanism to make an impression of one type of each series to print on different surfaces the characters indicating the registration incident to each movement.

32. In a cash register and indicator, the combination with the operating mechanism; of a reciprocating type-frame having a central portion as $n$ and end pieces as $n'$; a flexible type-plate attached to said ends and spanning the central space; and a platen-bar to make an impression.

33. In a cash register and indicator, the combination with the actuating and supporting means; of a flexible type-support adapted to be moved to a printing-line; a plate O' for flexing said support to make an impression; pivoted levers as O carrying said platen; and cams as O² moved by a moving part of the actuating means, said cams contacting and actuating said levers by their movement.

34. In a cash register and indicator, the combination with the actuating and supporting means; of two flexible plates having type mounted thereon in like series, but oppositely faced; and means of flexing said plates in opposite directions for the purposes set forth.

35. In a cash register and indicator, the combination with the actuating and supporting means; of the frame comprising a connecting portion as $u$ and end pieces $u'$; two flexible type-plates oppositely placed, attached at the ends and spanning the central space; and platen-bars as O' that flex said plates in opposite directions for the purposes set forth.

36. In a cash register and indicator, the combination with the actuating and supporting means; of two flexible type-supports each having a series of type thereon faced oppositely to the type of the other; platen as O' for flexing said type-supports in opposite directions to make separate impressions; pivoted levers as O crossed at the rear ends and provided with cam-surfaces $o'$; and the cams O² moved by said actuating means and operating upon the cam-surface $o'$ to actuate the levers O.

37. In a cash register and indicator, the combination with the operating mechanism; of a guide; a sliding frame mounted on said guide; a flexible type-plate mounted on said frame; a flexible type-band; rotative supports therefor so positioned as to bring one span of the band in a plane with the plane of said flexible type-plate; and means of flexing said plate and band to make an impression.

38. In a cash register and indicator, the combination with the operating mechanism; of a guide; a sliding frame on said guide; flexible type-plates oppositely mounted on said frames; a flexible type-band; rotative supports for said band so positioned to carry one span of the band in a plane with one of the plates and the opposite span with the opposite plate; and means of flexing said spans of the band-plates in pairs in opposite directions.

39. In a cash register and indicator, the combination with the registering mechanism; of a flexible type-band; rotative supports for said band; two series of type mounted upon said band, each series containing the same characters so positioned with reference to a printing-line and each other that as each character in one series is brought to the printing-line on one span of the band the like character in the other series is brought to the printing-line on the opposite span and means of flexing said bands in opposite directions to make an impression.

40. In a cash register and indicator, the combination with the registering mechanism; of a frame having mounted thereon two series of oppositely-faced type; a flexible type-band having two series of type thereon arranged to be carried on the opposite spans; a rotative support for said band that carries the spans of said band in a plane with type on said frame; an ink-ribbon in the form of an endless band; rotative supports for said ribbon that carry said ribbon across the faces of the opposed series of type on said type-frame and type-band.

41. In a cash register and indicator, the combination with a printing mechanism; and means of actuating said printing mechanism; of a cash-receptacle; mechanism for forcing said receptacle open with each operation; and means carried by said receptacle for holding a record material; a paper in position to receive the impression of said printing mechanism and in such position that the printing-line is out of view when said receptacle is closed and exposed to view when said receptacle is open.

42. In a cash register and indicator, the combination with a printing mechanism; and means of actuating said printing mechanism; of a cash-receptacle; and means carried by said receptacle for holding a record material as paper in position to receive the impression of said printing mechanism and in such position that the printing-line is out of view when said receptacle is closed and exposed to view when said receptacle is open.

43. In a cash register and indicator, the combination with a printing mechanism; and means of actuating said printing mechanism; of a money-receptacle; means of forcing said receptacle open with each operation; means of stopping a succeeding operation until the receptacle is closed; means in said receptacle for carrying a record-roll in position to receive the impression from said printing mechanism; and means actuated with each opening and closing of said receptacle for moving a new surface of said roll into position to be printed.

In testimony whereof I affix my signature in presence of two witnesses.

WILLIAM H. CLARK.

Witnesses:
JOSEPH T. MOOMY,
B. B. BROWN.